(12) United States Patent
Chapin

(10) Patent No.: US 6,208,767 B1
(45) Date of Patent: Mar. 27, 2001

(54) **HARDWARE ROTATION OF IMAGES WITH LINE SORTING IN L*A*B* COLOR SPACE**

(75) Inventor: Robert Chapin, Rushville, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/144,917

(22) Filed: Sep. 1, 1998

(51) Int. Cl.⁷ .................................................. G06K 9/32
(52) U.S. Cl. ........................ 382/296; 345/436; 348/583
(58) Field of Search .................................. 382/296, 297, 382/164, 167; 345/126, 436; 348/436

(56) References Cited

U.S. PATENT DOCUMENTS

| | | | |
|---|---|---|---|
| 4,627,020 | * 12/1986 | Anderson et al. ................. | 364/900 |
| 4,703,515 | * 10/1987 | Baroody, Jr. ........................ | 382/46 |
| 5,068,904 | * 11/1991 | Yamazaki ............................ | 382/46 |
| 5,235,651 | * 8/1993 | Nafarich ............................. | 382/46 |
| 5,956,049 | * 9/1999 | Cheng .................................. | 345/517 |

* cited by examiner

Primary Examiner—Joseph Mancuso
Assistant Examiner—Yosef Kassa
(74) Attorney, Agent, or Firm—Fay, Sharpe, Fagan, Minnich & McKee, LLP

(57) ABSTRACT

A method for rotating an input image matrix having pixel grouping data to form an output image matrix in a computer is provided. The pixel grouping data is accessed and read-dressed to rotate the input image matrix. The pixel grouping data is desampled into desampled pixel grouping data. At least one line of the desampled pixel grouping data is sorted into a plurality of groups of desampled pixel grouping data. A first group of the desampled pixel grouping data is written to a first line of the output image matrix. A second group of the desampled pixel grouping data is written to a second line of the output image matrix. Preferably, the pixel grouping data represents subsampled color image data in L*a*b* space. The method takes advantage of the bandwidth of high-performance busses in direct memory access systems to rotate data in real-time.

18 Claims, 5 Drawing Sheets

HARDWARE ROTATION OF IMAGES WITH LINE SORTING IN L*A*B* COLOR SPACE

BACKGROUND OF THE INVENTION

The present invention relates to the color imaging arts. It finds particular application in digital color image copiers and will be described with particular reference thereto. It is to be appreciated, however, that the invention is applicable in other digital image processing applications (both color and monochrome) such as digital color scanners, printers, fax machines, plotters and the like, and in other environments and applications.

The generation of color documents can be thought of as a two-step process: first, a color image is generated by scanning an original document with a color image input terminal or scanner or, alternatively, creating a color image on a work station operated in accordance with a color image creation program; and second, printing the color image with a color printer in accordance with the colors defined by the scanner or computer generated image.

In a scanner, a color document is scanned line by line to acquire a full image of the document. The full image is represented as a two-dimensional data set of pixel information. The data set consists of line data in one dimension and column data in the other dimension. Due to the rastering motion of the particular input device in the scanner, a line of data is acquired relatively quickly. In contradistinction, each column of data, which is perpendicular to the line of data, is acquired relatively slowly. Accordingly, the axis of the image or acquired data set that is parallel to each line of data is called the fast-scan direction. Analogously, the axis of the image or acquired data set that is parallel to each column of data is called the slow-scan direction.

Scanner output is commonly transformed to a color space of tristimulus values, i.e., RGB (red-green-blue). Usually, these values are linearly transformed into standard XYZ coordinates-of CIE color space, or a corrected transform of those values. An example of a CIE color space is the luminance-chrominance space termed CIE 1976 L*a*b* (CIELAB), where L* is lightness value, a* is a redness-greenness value, and b* is a yellowness-blueness value. These tristimulus values, which are essentially defined at the user interface, are independent of any particular device. Accordingly, the tristimulus information is referred to as being "device independent".

Printers have an output which can be defined as existing in a color space called CMYK which stands for Cyan, Magenta, Yellow, and Key or black. The CYMK color space is uniquely defined for the printer by its capabilities and colorants. Printers operate by the addition of multiple layers of ink or colorants. The response of a printer tends to be relatively non-linear. These colors are defined for a particular device, and accordingly, reference is made to the information as being "device dependent". While a printer receives information in a device-independent color space, it must convert that information to print in a device-dependent color space, which reflects the gamut or possible range of colors of the printer.

In a color copier having both a scanner and a printer, it is often desirable to electronically rotate an inputted image 90°, 180°, or 270° before printing.

However, such rotation provides many bandwidth and system resource problems. Further, deciding which color space to rotate in provides a complex array of issues.

In the present invention, it has been found that rotating in L*a*b* color space requires far less memory space and processing time over rotating in RGB or CYMK space. Nonetheless, rotating the L*a*b* data in the hardware of the color imaging device still provides a variety problems, particularly in direct memory access (DMA) based systems. More specifically, each L*a*b* data point (non-subsampled) or pixel uses 8×3=24 bits or 3 bytes. This data is written to a page buffer in the DMA system. However, most DMA systems operate on a 32 bit word boundary. Thus, a 24 bit or 3 byte operation crosses over the word boundary. This necessitates a minimum of two address writes to pick up the additional byte. Such a solution is cumbersome and very slow.

The present invention provides a new and improved method and apparatus for rotating a color image in L*a*b* color space which overcomes the above-referenced problems and others.

SUMMARY OF THE INVENTION

In accordance with one aspect of the present invention, a method for rotating an input image matrix having pixel grouping data to form an output image matrix in a computer is provided. The pixel grouping data is accessed and read-dressed to rotate the input image matrix. The pixel grouping data is desampled into desampled pixel grouping data. At least one line of the desampled pixel grouping data is sorted into a plurality of groups of desampled pixel grouping data. A first group of the desampled pixel grouping data is written to a first line of the output image matrix. A second group of the desampled pixel grouping data is written to a second line of the output image matrix.

In accordance with another aspect of the present invention, an apparatus for electronically rotating an input image matrix having pixel grouping data to form an output image matrix is provided. A memory access accesses the pixel grouping data. A rotation processor readdresses the pixel grouping data to rotate the input image matrix. A desampling processor desamples the pixel grouping data into desampled pixel grouping data. A sorting processor sorts a line of the desampled pixel grouping data into a plurality of groups of desampled pixel grouping data. A line buffer stores a first group of desampled pixel grouping data. A memory stores the first group of desampled pixel grouping data as a first line of the output image matrix and a second group of desampled pixel grouping data as a second line of the output image matrix.

One advantage of the present invention is that it takes advantage of the bandwidth of high-performance busses in direct memory access systems to rotate data in real-time.

Another advantage of the present invention is that it involves less data processing than other means of rotation.

Yet another advantage of the present invention is that it provides an error-free rotation.

Another advantage of the present invention is that it minimizes memory use and storage space.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION OF THE PREFERRED EMBODIMENTS

Figure 1:
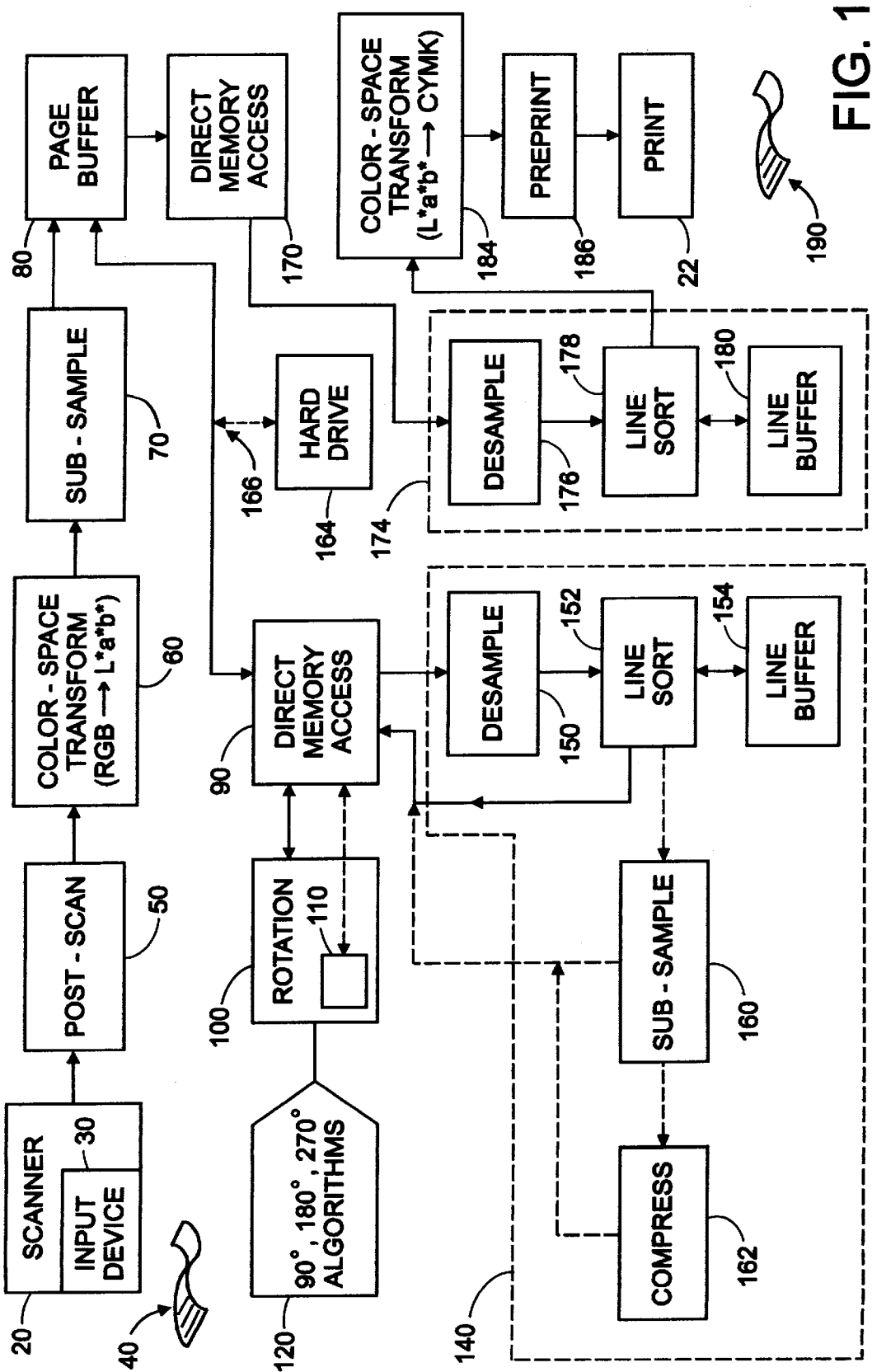
FIG. 1 illustrates a preferred embodiment of a digital color imaging copier which scans an input image and then rotates, stores, corrects and prints an output image therefrom in accordance with the present invention.

With reference to FIG. 1, an exemplary system for carrying out the present invention is a color copier 10 which has a scanner 20 and printer 22. The scanner 20 includes an input device 30 which scans a hard copy document 40 and converts it into digital form. The scanner is calibrated to produce a set of digital calorimetric or device independent data describing a scanned image, which, by definition can be defined in terms of the calorimetric RGB space.

A post-scanning processor 50 assigns address or x, y values in the fast-scan and slow-scan directions to each pixel of acquired RGB data. The address values are set in accordance with the x, y position on the document where the pixel of data was acquired. A color space transform processor 60 transforms the RGB color space data into L*a*b* color space data while retaining the address values.

A subsampler 70 subsamples the L*a*b* data to create pixel data on 32 bit boundaries. This generally allows more efficient processing of the image data. More particularly, two L*a*b* pixels are represented by the original two L* values and only one averaged a* value and one averaged b* value. In this regard, the original two a* values are simply averaged to one a* value. Analogously, the original two b* values are simply averaged to one b* value. Thus, after subsampling, a 32 bit word represents 2 pixels.

The subsampled data is temporarily stored in memory or page buffer 80. A first direct memory access (DMA) processor 90 accesses the subsampled data in the page buffer. The subsampled L*a*b* data is sent to a rotation processor 100.

The rotation processor 100 rotates the image 90°, 180° or 280°. Within the rotation processor, two internal counters 110 keep track of the fast-scan and slow-scan coordinates of the data. These coordinates are fed to an algorithm which calculates page buffer addresses for the data.

An algorithm processor 120 receives the coordinates of the data and calculates an address for the page buffer 80. To do this, the algorithm processor contains algorithms for each of the desired rotation angles, 90°, 180° or 280°. The rotated data is then written, via the first direct memory access processor, to the page buffer 80. This process of reading the input image, updating the counters in the microcontroller, determining a new page buffer address, and writing to the page buffer can be performed virtually simultaneously to save time.

Rotating 90° and 270° takes data sequentially in the fast-scan direction and writes it to the page buffer 80 in the slow-scan direction. This creates a situation of continuous random addressing. The described embodiment of the present invention is peripheral component interconnect (PCI) based so that many DRAM memory controllers can be used to create a very cost effective page buffer. Further, in the present embodiment, data is written out 4 bytes at a time to maximize bandwidth on most multi-master bus structures such as the PCI bus.

Figure 2:
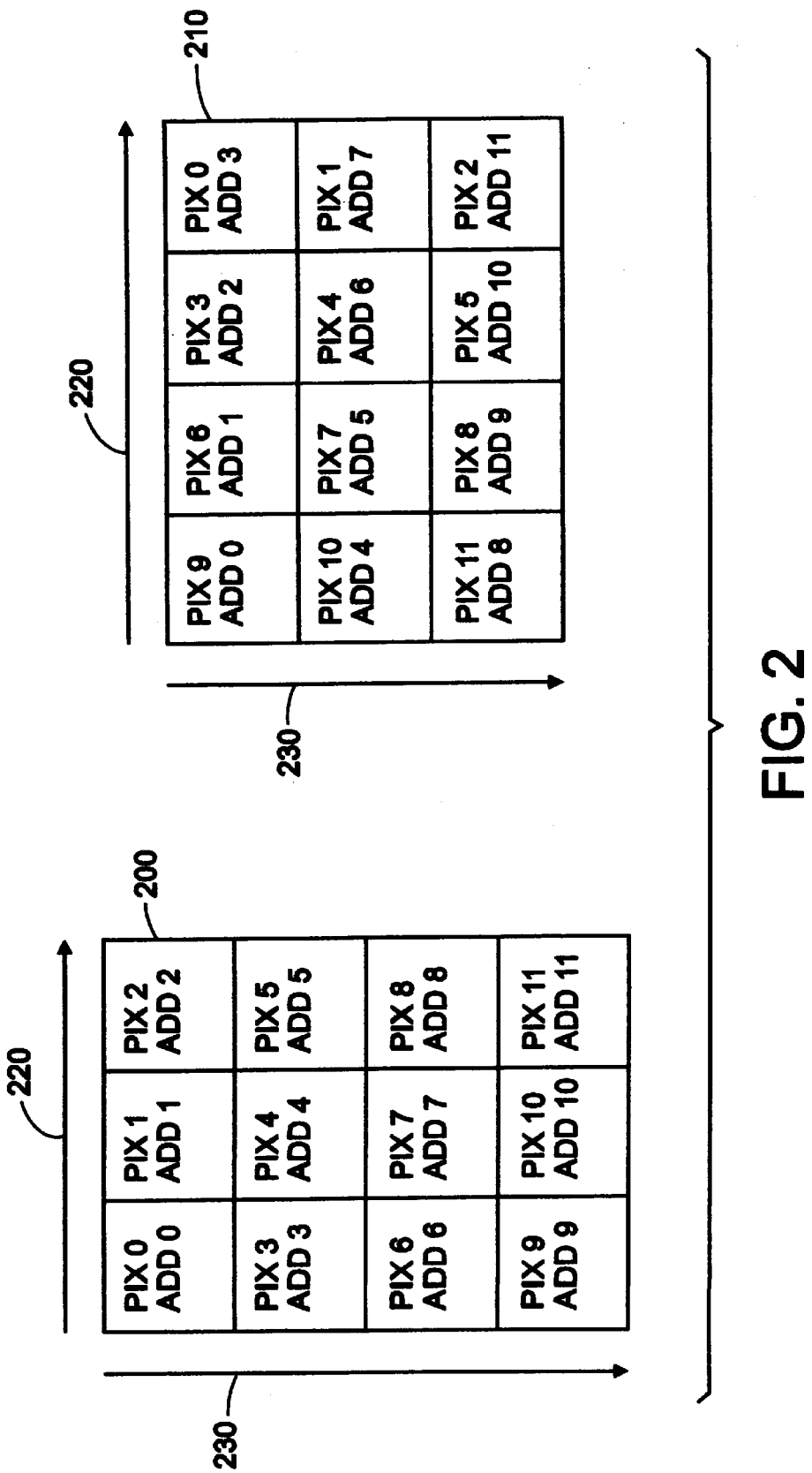
FIG. 2 illustrates a non-subsampled input matrix and an output matrix that has been rotated 900 in accordance with the present invention.

With continuing reference to FIG. 1 and reference to FIG. 2, exemplary input data 200 is rotated 90° by the rotation processor to form exemplary rotated output data 210. The exemplary input data has 1 byte per pixel, 3-bytes per scanline in the fast-scan direction 220, and 4 scanlines in the slow-scan direction 230. The exemplary output data is also 1 byte per pixel, but has 4 bytes per scanline and 3 scanlines. Of course, the present invention processes larger amounts of image data and pixel data having more or less than 1 byte per pixel. However, to illustrate the functioning of the rotation processor, a small amount of data having only 1 byte per pixel is shown. In this example, "Add" is the address location where the image is stored and restored in the page buffer continuously. "Pix" is the pixel number. The input stream of input image data is received sequentially, left to right (in the fast-scan direction) starting from Pixel 0 of the input data 200. Pixel 0, the first data byte received, is written to address location 3 in the output data 210. Then, pixel 1 is received which is written to address location 7 in the output data 210. This process is continued until the last pixel 11 of the input data 200 is written to address location 8 in the output data 210. In this manner, the rotation processor and algorithm processor rotate an image 90° in contiguous memory.

Optionally, tags or image descriptors are associated with each pixel of the input data to provide for segmentation of the image. In such case, after the input data is rotated, the tags are passed through the rotation processor. This rotates the tag information so that it is relevant to the pixel input data. If the memory resource is available, the rotation processor includes a separate channel to allow concurrent tag rotation.

For image data having more than one pixel per data unit or pixel grouping and which image data is rotated 90° or 270°, a stretching problem occurs due to the pixel grouping. In this regard, rotation of the subsampled data of the present invention 90° or 270° stretches the image or makes it appear to the eye as if the image were elongated in the fast-scan direction and compressed in the slow-scan direction.

Figure 3:
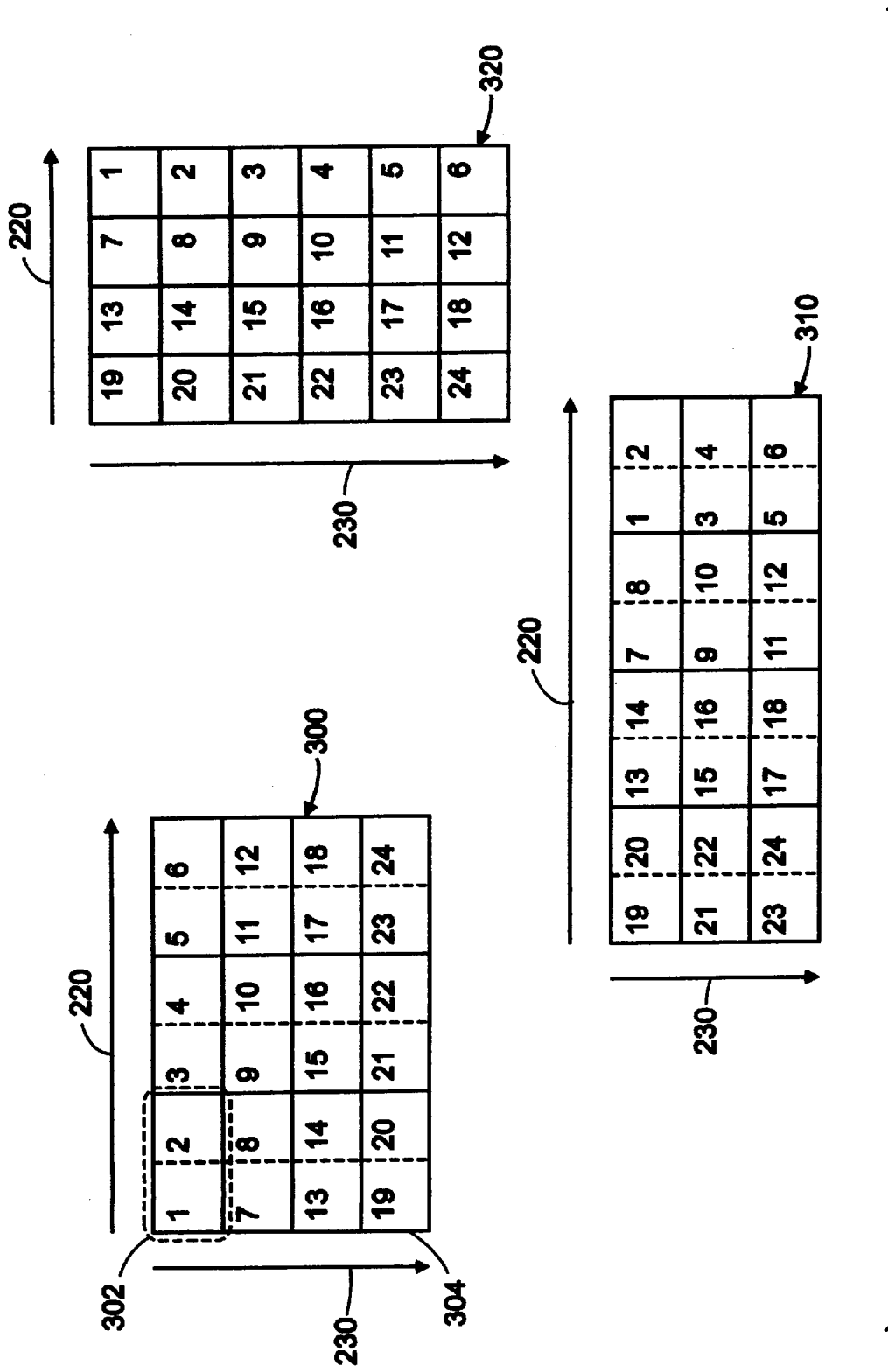
FIG. 3 illustrates a subsampled input matrix 300, a rotated subsampled output matrix 310 that has been rotated without error correction; and a desired or corrected output matrix 320 in accordance with the present invention.

With continuing reference to FIG. 1 and reference to FIG. 3, exemplary input data matrix 300 is rotated 90° by the rotation processor 100 to form a "stretched" erroneous rotated output data matrix 310 instead of the desired output data matrix 320. The exemplary subsampled input data matrix has 32 bits per 2 pixels or pixel grouping 302, 6-pixels per scanline 304 in the fast-scan direction 220, and 4 scanlines in the slow-scan direction 230. It is to be appreciated that, in other embodiments of the invention, the pixel grouping may represent two or more pixels.

Each pixel grouping 302 represents the 32 bit boundaries that hardware is typically constrained to in order to achieve maximum through-put efficiency. Pixels grouped on either side of the dotted line in each pixel grouping 302 will stay together during rotation when the interface to the memory is 32 bits. The "stretched" output data matrix has 8 pixels per scanline and 3 scanlines. However, the desired output or corrected matrix 320 has 4 bytes per scanline and 6 scanlines.

With continuing reference to FIG. 1 and FIG. 3, the image data rotated 90° or 270° must be corrected. In one option, this correction is performed simultaneously with printing which is discussed below. In another option, the rotated data is stored or transferred over a network in uncorrected form. In a third option, the rotated data is corrected and then stored or transfered over a network. In this instance, a first correction or loopback processor 140 corrects the distortion caused by the pixel grouping.

The first correction processor 140 can be on the same ASIC as the rotation processor. The term "loopback", which is to be appreciated by those skilled in the art, refers to the configuration of the rotation processor and correction processor in a DMA/PCI system. The input data is first accessed for rotation and then the rotated data is "looped back" for correction.

Figure 4:
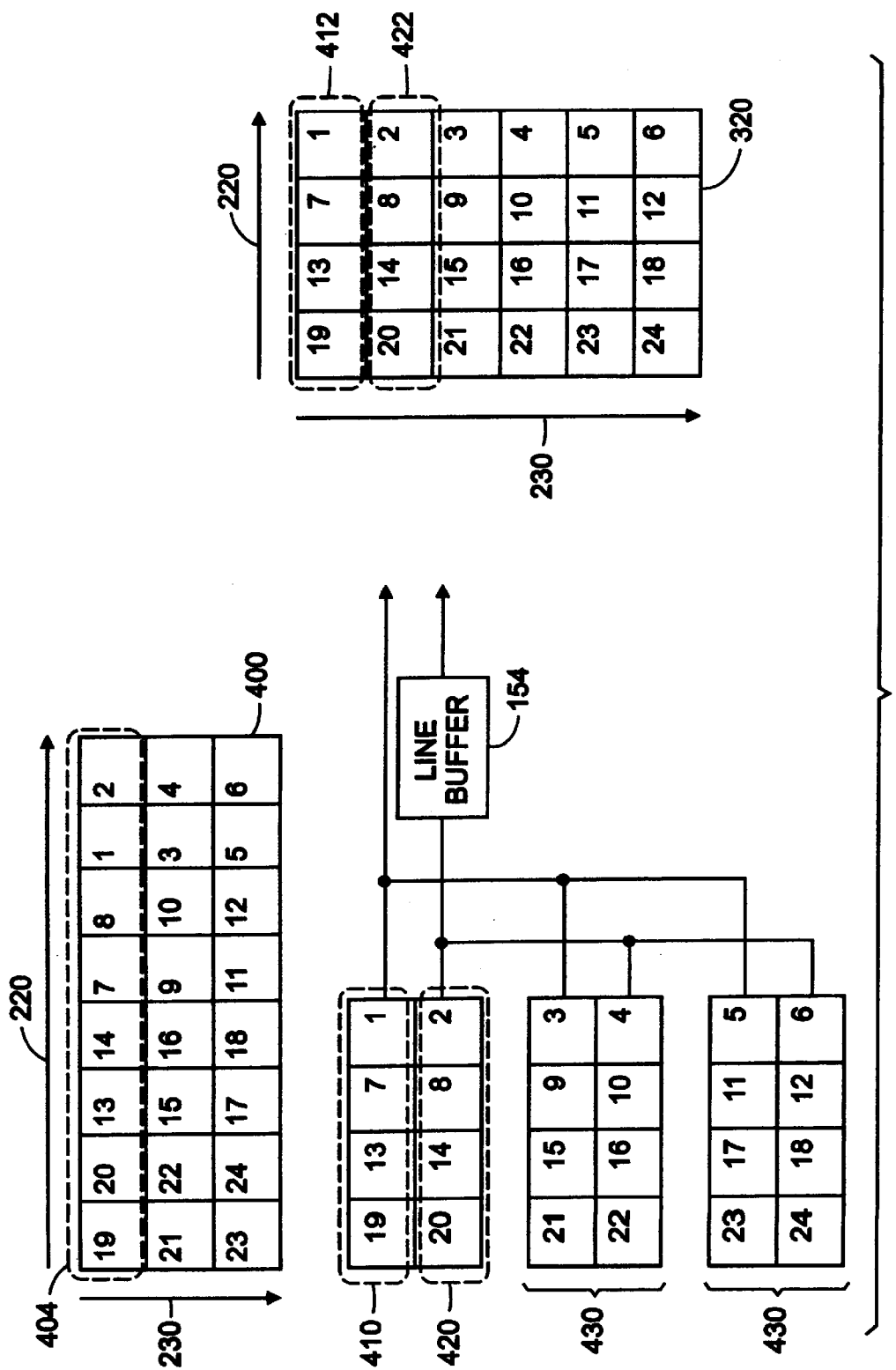
FIG. 4 illustrates sorting of a 90° rotated de-subsampled input matrix 400 to create the corrected rotated output matrix 310 in accordance with the present invention.

With continuing reference to FIG. 1 and general reference to FIGS. 3 and 4, the correction processor 140 includes a desampler 150 which receives the subsampled L*a*b* data 300 from the page buffer 80 on a scanline basis. The desampler then desamples the "stretched" rotated data 310 to create an equivalent byte map 400. A line sorter 152 receives a first desampled scanline 404 and sorts out every other L*a*b* pixel 410, i.e., even numbered pixels, and stores them in a temporary scanline buffer 154. All odd numbered pixels or a first assemblage of pixels 410 are written to the page buffer 80. Once all of the odd numbered pixels 410 of a scanline 404 are written out to create a first corrected image scanline 412, all associated even numbered pixels or a second assemblage of pixels 420 in the temporary scanline buffer are written out to the page buffer to create a full second scanline 422. This sorting of each rotated "stretched" scanlines 404 into two successive scanlines 430 is done for the entire image to created the corrected rotated image 320. This is an error-free rotation. Taking every other pixel out of each scanline does a fast-scan reduction of 100%. Creating two scanlines for every scanline does a slow-scan magnification of 100%.

With continuing reference to FIG. 1, in another embodiment, a second subsampler 160 subsamples the data before writing to the page buffer. This saves memory resources. In yet another embodiment, a compressor engine 162 compresses the data to save memory resources. Compressing the data is preferable when storing data or transferring data over networks. In still another embodiment, both the subsampler and the compressor engine are used. The data is then stored on a hard drive 164 for later access.

In the present embodiment, the rotation and correction processors are in the form of an application specific integrated circuit (ASIC) or plurality of ASICS that are part of the DMA-based system. The ASIC includes the peripheral component interconnect (PCI) bus or bus master 166. This increases bandwidth performances which allows real time rotation while eliminating distortion from pixel grouping. However, it is to be appreciated that other computer architectures may be used to implement the invention.

With reference to FIG. 1, as stated above, rotated but uncorrected data may corrected simultaneously with printing or stored for later correction and simultaneous printing. In these instances, a second direct memory access (DMA) processor 170 accesses the rotated data from the page buffer 180 or from the hard drive 164 via the page buffer. A second elongation correction processor 140 corrects the distortion caused by the pixel grouping.

With continuing reference to FIG. 1 and general reference to FIGS. 3 and 4, the correction processor 174 includes a desampler 176 which receives the subsampled L*a*b* data 300 from the page buffer 80 on a scanline basis. The desampler then desamples the "stretched" rotated data 310 to create an equivalent byte map 400. A line sorter 178 receives a first desampled scanline 404 and sorts out every other L*a*b* pixel 410, i.e., even numbered pixels, and stores them in a temporary scanline buffer 180. All odd numbered pixels or a first assemblage of pixels 410 are written to the page buffer 80. Once all of the odd numbered pixels 410 of a scanline 404 are written out to create a first corrected image scanline 412, all associated even numbered pixels or a second assemblage of pixels 420 in the temporary scanline buffer are written out to the page buffer to create a full second scanline 422. This sorting of each rotated "stretched" scanlines 404 into two successive scanlines 430 is done for the entire image to created the corrected rotated image 320.

A color-space transform processor 184 receives the corrected L*a*b* data from the line sorter 178, filters it, and transforms it into CYMK values more appropriate for printing. A pre-print processor 186 performs conversion resolution, rendering, and the like prior to printing the rotated corrected image 320 on the printer 22.

Figure 5:
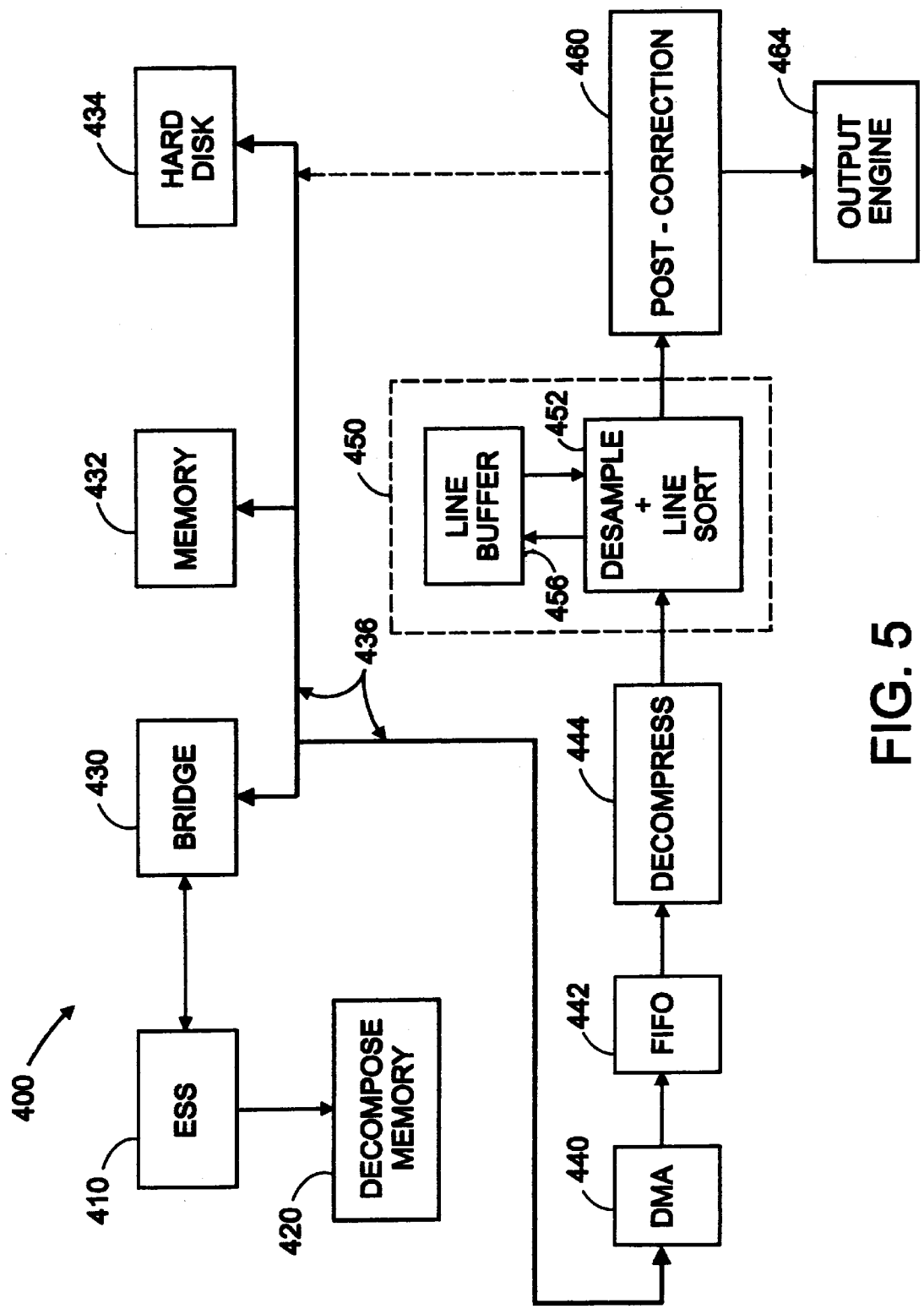
FIG. 5 illustrates another preferred embodiment of a digital color imaging copier which electronically corrects a rotated subsampled input image 90°, 180°, or 270° before printing in accordance with the present invention.

With reference to FIGS. 3 and 5, in an alternative embodiment of the invention, a single pass video rotation system 400 performs the correction of the input data. Like the copier described above, the system is a PCI/DMA-based system; however, this system more particularly shows the architecture that is known by those skilled in the art. Accordingly, the system includes an electronic subsystem (ESS) 410 and an associated decomposer memory 420. Further, the system includes a bridge 430, a memory or page buffer 432, a hard disk drive 434, and a PCI-based video bus 436.

In this embodiment, a compressed, rotated "stretched" image subsampled in L*a*b* space, which may be represented by image 310 of FIG. 3, is already stored in the page buffer 432. A direct memory access processor reads the image into a FIFO buffer 442. optionally, a decompressor 444 decompresses the data.

With continuing reference to FIG. 5 and general reference to FIGS. 3 and 4, for image data rotated 90° or 270°, a correction processor 450 corrects the distortion caused by the pixel grouping 302. The correction processor 450 includes a desampler and line sorter 450 which receives the subsampled L*a*b* data 300 on a scanline basis. The desampler and line sorter then desamples the "stretched" rotated data 310 to create an equivalent byte map 400. The desampler and line sorter 452 receives a first desampled scanline 404 and sorts out every other L*a*b* pixel 410, i.e., even numbered pixels, and stores them in a temporary scanline buffer 456. The odd numbered pixels 410 are written to a post-correction processor 460. Once all of the odd numbered pixels 410 of a scanline 404 are written out to create a first corrected image scanline 412, all associated even numbered pixels 420 in the temporary scanline buffer are written out to the post-correction processor to create a full second scanline 422. This sorting of each rotated "stretched" scanlines 404 into two successive scanlines 430 is done for the entire image to created the corrected rotated image 320.

The post correction processor 460 optionally filters, transforms the color space of, converts the resolution of, and renders the corrected data and the like. An output engine 464 then prints, displays, transfers over a network, or otherwise conveys the finalized data.

Alternatively, the data may be stored in memory 432 or on the hard disk drive 434. It is to be appreciated by those skilled in the art that additional processors or processing steps may be added to give the options of storing the image data either subsampled or non-subsampled in either a compressed or uncompressed format.

With reference to FIG. 3, although the input image 300 was rotated 90° in the embodiments described above, the same "stretch" problem and method and apparatus for correction of the problem are applicable to achieve a 270° rotation. In this regard, a 270° rotation can simply be thought of as a −90° rotation. Of course, when rotating data 180°, pixel grouping does not cause a "stretch" problem. Thus, data rotated 180° does not need to be corrected and bypasses the correction processor.

Other image paths can be built in to take advantage of an ESS that has images stored in the L*a*b* format. For example, a loopback job may be performed by pointing to ESS memory via a video bus master residing in an ASIC. The bridge chip identifies the address supplied by a "loop master" (by the given bus protocol) as ESS memory. The L*a*b* image is initially stored in the ESS memory. The image is moved from ESS memory to the DMA processor through the loopback path and rotated. Optionally, the video disk may contain L*a*b* images that can also take advantage of the loopback path for rotation.

Another option for print purposes is a resolution conversion if the output device expects a different resolution than the after-rotation resolution. Since it is very common for a resolution conversion to be done at the final output stage, this presents no problems to the system. For example, if the input image is 600 pixels per inch in the fast-scan direction and 400 spots per inch (spi) in the slow-scan direction, after rotation, the fast-scan resolution is 600 spots per inch and the slow-scan resolution is 400 spots per inch. If the output device is designed to print at 600×600, a 150% interpolation or magnification must be done in the slow-scan direction.

The present invention may be used in other embodiments and with other color spaces. However, rotation in L*a*b* color space has many advantages over byte map rotation. From a system point of view, L*a*b* is considered a good color space to work in because of its relative ease in color data exchange. L*a*b* is good for compression, decompression, and is monochrome compatible. Further, rotating L*a*b* data rotates the whole color space with a single pass.

In particular, rotation in L*a*b* color space has many advantages over rotating in CYMK color space. First, rotation in L*a*b* space involves far less data processing that rotation in CYMK space. Typically, resolution conversions are done after converting from L*a*b* to CYMK color space. The amount of data to rotate increases by the resolution factor. A common resolution for L*a*b* is 600×400 fast-scan/slow-scan respectively. With subsampling, an 8.5× 11 inch image requires 44,800,000 bytes of memory. If a resolution conversion is done which changes the resolution from 600×400 to 600×600, each plane of the CYMK data would require 33,600,000 bytes of memory. Consequently, rotating all 4 planes would require tremendous memory and system resources.

Second, rotation in L*a*b* color space requires fewer processing steps than rotating in CYMK color space. Rotating L*a*b* data requires 1 to 2 processing passes. The first pass is the rotation. The second pass sorts out the scanlines. Am additional pass can compress the data without any losses. In contradistinction, rotating CYMK requires 4 to 8 passes to acquire 4 rotated output images which must be superimposed during printing. In this case, it takes 8 passes of looping back plane data to achieve compression of the rotated outputs.

Third, rotation in L*a*b* color space is faster than rotating in CYMK color space. It takes much less time to send 44 megabytes of data through a video path once versus sending 33 megabytes through a video path 4 times. Thus, the present invention allows real time rotation from a scan path. Formerly, hardware rotation could not be performed in real time because of the random addressing used to address the memory controller to the page buffer. Staying on 32 bit boundaries maximizes through-put. This barrier can now be overcome by innovative ideals coupled with high performance buses such as the PCI bus. For example, on a 66 MHz PCI bus, 80 megabytes per second transfer rates can be achieved using the present invention. These bandwidths allow real time scan path rotations from 65 cpm 400×600 spi color copiers.

Memory storage is another advantage. Because the chrominance components of the image data are subsampled, much less memory is needed to store a rotated image. Another advantage of rotating in L*a*b* space in the manner described above is that a single pass rotates the whole color space. As previously stated, rotating CYMK or RGB space creates the need to perform several loopback operations or passes to create multiply rotated planes. This overloads the video bus and microprocessor and takes away real time from other real time bus masters. In the present invention, it is preferable to rotate the data before converting it from L*a*b* to CYMK color space. This frees up system resources more effectively.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the preferred embodiment, the invention is now claimed to be:

1. A method of rotating an input image matrix having pixel grouping data to form an output image matrix in a computer, the method comprising the steps of:
   accessing the pixel grouping data, each element of the pixel grouping data representing distinct pixel data for a plurality of distinct pixels;
   readdressing the pixel grouping data to rotate the input image matrix;
   desampling the pixel grouping data into distinct pixel data;
   sorting a line of the distinct pixel data into a plurality of groups of distinct pixel data;
   writing a first group of distinct pixel data to a first line of the output image matrix; and
   writing a second group of distinct pixel data to a second line of the output image matrix.

2. The method as set forth in claim 1 wherein the computer is incorporated in one of a digital color scanner, a digital color printer, a digital color copier, and a digital computer data network.

3. The method as set forth in claim 1 wherein the input image matrix is rotated ±90°.

4. The method as set forth in claim 1 wherein the pixel grouping data represents a color image.

5. The method as set forth in claim 4 wherein the pixel grouping data represent subsampled L*a*b* data.

6. The method as set forth in claim 1 further comprising the step of subsampling at least the first line of the output image matrix.

7. The method as set forth in claim 1 further comprising the step of compressing at least the first line of the output image matrix.

8. The method as set forth in claim 1 further comprising the step of storing at least a portion of one of the groups of sorted distinct pixel data in a buffer.

9. The method as set forth in claim 1 further comprising the steps of:
   accessing image descriptors associated with the pixel grouping data; and
   readdressing the image descriptors to relate them to the rotated pixel grouping data.

10. An apparatus for electronically rotating an input image matrix having pixel grouping data to form an output image matrix, the apparatus comprising:
   a memory access for accessing the pixel grouping data;
   a rotation processor for readdressing the pixel grouping data to rotate the input image matrix;
   a desampling processor for desampling the pixel grouping data into desampled pixel grouping data;
   a sorting processor for sorting a line of the desampled pixel grouping data into a plurality of groups of desampled pixel grouping data;
   a line buffer for storing a first group of desampled pixel grouping data; and
   a memory for storing the first group of desampled pixel grouping data as a first line of the output image matrix and a second group of desampled pixel grouping data as a second line of the output image matrix.

11. The apparatus as set forth in claim 10 wherein the apparatus is connected to one of a digital color scanner, a digital color printer, a digital color copier, and a digital computer data network.

12. The apparatus as set forth in claim 10 wherein the input image matrix is rotated ±90°.

13. The apparatus as set forth in claim 10 wherein the pixel grouping data represents a color image.

14. The apparatus as set forth in claim 13 wherein the pixel grouping data represents subsampled L*a*b* data.

15. The apparatus as set forth in claim 10 further comprising a subsampling processor for subsampling at least the first line of the output image matrix.

16. The apparatus as set forth in claim 10 further comprising a compressing engine for compressing at least the first line of the output image matrix.

17. A method of correcting a rotated image matrix having pixel grouping data to form a corrected output image matrix in a computer, the method comprising the steps of:
   accessing the pixel grouping data;
   desampling the pixel grouping data into desampled pixel grouping data;
   sorting a first line of the desampled pixel grouping data into a first plurality of groups of desampled pixel grouping data;
   writing to a memory a first group of the first plurality of groups of desampled pixel grouping data as a first line of the corrected output image matrix; and,
   writing to the memory a second group of the first plurality of groups of desampled pixel grouping data as a second line of the output image matrix, wherein the first and the second lines are adjacent; and,
   repeating the steps of sorting and writing to form the corrected output image matrix.

18. The method as set forth in claim 17 wherein the computer includes of a direct memory access (DMA) and a peripheral component interconnect (PCI) bus.

* * * * *